(12) United States Patent
Zhu et al.

(10) Patent No.: US 8,446,852 B2
(45) Date of Patent: May 21, 2013

(54) SYSTEM AND METHOD FOR SELECTING AN ACCESS LINK IN A MULTI-HOP RELAY NETWORK

(75) Inventors: Chenxi Zhu, Gaithersburg, MD (US); Hui Zeng, Greenbelt, MD (US); Wei-Peng Chen, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1302 days.

(21) Appl. No.: 12/199,707

(22) Filed: Aug. 27, 2008

(65) Prior Publication Data

US 2010/0054171 A1 Mar. 4, 2010

(51) Int. Cl.
*H04B 7/14* (2006.01)

(52) U.S. Cl.
USPC .......................................................... 370/315

(58) Field of Classification Search
USPC .......................................................... 370/315
See application file for complete search history.

(56) References Cited

U.S. PATENT DOCUMENTS

| | | | |
|---|---|---|---|
| 2007/0201400 A1* | 8/2007 | Kang et al. | 370/329 |
| 2008/0057973 A1* | 3/2008 | Park | 455/452.2 |
| 2009/0059819 A1* | 3/2009 | Choi et al. | 370/280 |
| 2009/0303900 A1* | 12/2009 | Cho et al. | 370/252 |

OTHER PUBLICATIONS

Draft Standard for Local and Metropolitan Area Networks, Part 16: Air Interface for Broadband Wireless Access Systems, P802.16Rev2/DT Oct. 2008, © 2008 IEEE (2080 pages).
IEEE Standard for Local and Metropolitan Area Networks, Part 16: Air Interface for Fixed Broadband Wireless Access Systems, IEEE Std. 802.16™-2004 (Revision of IEEE Std. 802.16-2001 (857 pages), Oct. 1, 2004.
802.16.2™ IEEE Recommended Practice for Local and Metropolitan Area Networks, Coexistence of Fixed Broadband Wireless Access Systems, IEEE Std. 802.16.2™-2004 (Revision of IEEE Std. 802.16.2-2001 (171 pages), Mar. 17, 2004.

* cited by examiner

*Primary Examiner* — Sulaiman Nooristany
(74) *Attorney, Agent, or Firm* — Baker Botts L.L.P.

(57) ABSTRACT

A method for selecting an access link in a multi-hop relay network includes determining a first effective spectrum efficiency value of a first connection between an endpoint and a base station. The first effective spectrum efficiency value is indicative of the spectrum efficiency from the endpoint to the base station when the first connection is used. The method also includes determining a second effective spectrum efficiency value of a second connection between the endpoint and the base station via a relay station. The second effective spectrum efficiency value is indicative of the spectrum efficiency from the endpoint to the base station when the second connection is used. The method also includes comparing the first and second effective spectrum efficiency values. The method further includes establishing a connection using one of the first or second connections based on the comparison of the first and second effective spectrum efficiency values.

12 Claims, 3 Drawing Sheets

SYSTEM AND METHOD FOR SELECTING AN ACCESS LINK IN A MULTI-HOP RELAY NETWORK

TECHNICAL FIELD OF THE INVENTION

This invention relates in general to multi-hop networks and, more particularly, to a system and method for selecting an access link in a multi-hop relay network.

BACKGROUND OF THE INVENTION

While broadband network services and Voice over IP (VoIP) products continue to grow and expand, so does the demand for wireless network functionality. To help meet this demand, networks are being developed that use multiple base stations (BSs), relay stations (RSs), access points or other points of contact. In many scenarios the various BSs, RSs, access points or other points of contact communicate with one another via wireless channels. One emerging wireless technology is IEEE 802.16 (including 802.16j and 802.16m), popularly known as WiMAX. WiMAX provides broadband wireless access, with a single BS providing coverage over a large area (theoretically up to 31 miles). The coverage area of a cell (the area controlled by a particular BS) may be extended and the system capacity enhanced through the use of RSs. RSs may be functionally placed between a BS and a user or mobile station (MS). As placed the RS may relay data and control packets between the MS and the BS. The RS may also be connected to other RSs for further extending the coverage area or enchanting the system capacity.

IEEE 802.16j defines its RS as an add-on feature to the 802.16e standard and requires the relay features of 802.16j to be transparent to the 802.16e MS. Consequently an 802.16e MS either does not recognize the existence of a RS at all (e.g., a transparent RS), or recognizes a RS as an 802.16e BS (e.g., a non-transparent RS). 802.16m is designed to include a multi-hop relay feature. It has been agreed by the 802.16m task group that an 802.16m MS shall recognize an 802.16m RS as a RS, in other words a different entity than a BS.

Other wireless networking technologies include Third Generation (3G), Third Generation Partnership Project (3GPP), and IEEE 802.11, popularly known as WiFi.

SUMMARY

In accordance with a particular embodiment, a method for selecting an access link in a multi-hop relay network includes determining a first effective spectrum efficiency value of a first connection between an endpoint and a base station. The first effective spectrum efficiency value is indicative of the spectrum efficiency from the endpoint to the base station when the first connection is used. The method also includes determining a second effective spectrum efficiency value of a second connection between the endpoint and the base station via a relay station. The second effective spectrum efficiency value is indicative of the spectrum efficiency from the endpoint to the base station when the second connection is used. The method also includes comparing the first and second effective spectrum efficiency values. The method further includes establishing a connection using one of the first or second connections based on the comparison of the first and second effective spectrum efficiency values.

Technical advantages of particular embodiments may include allowing a mobile station to make an informed choice in selecting an access link with which to connect. Accordingly, the mobile station may be able to provide a more consistent user experience. Another technical advantage of particular embodiments may include increasing the maximal spectrum efficiency in a wireless relay network. Accordingly, the overall network capacity may be increased.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
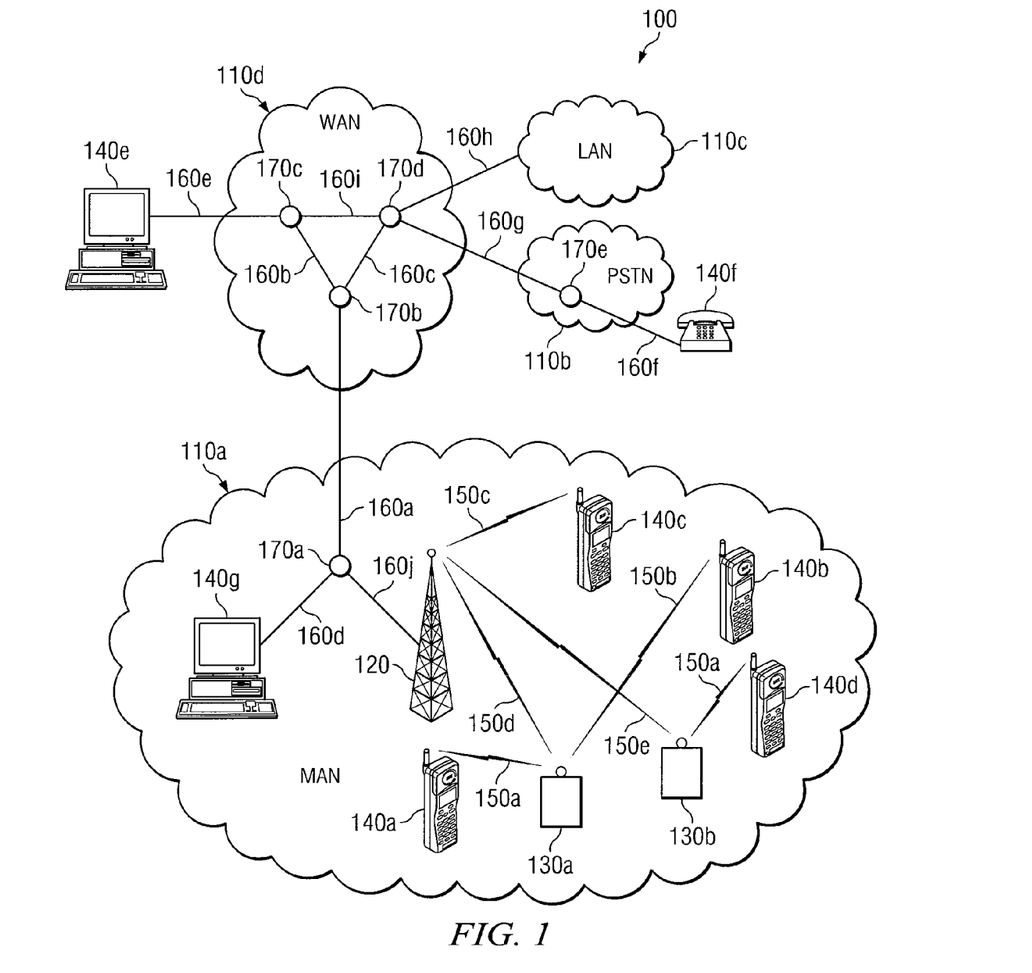
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16m), popularly known as WiMAX, which may include base stations, such as base station 120, and relay stations, such as relay stations 130. Network 110a may provide for the use of relay stations 130 by implementing 802.16j. A WiMAX network that uses relay stations may be referred to as a mobile multi-hop relay (MMR) network.

Within a network using a wireless protocol (e.g., 802.16m), such as network 110a, particular embodiment may allow for endpoints 140 to decide whether to connect to base station 120 or one of relay stations 130. In some embodiments this decision may be based on the spectrum efficiency of the single-hop access link (e.g., link 150c between base station 120 and endpoint 140c), the multi-hop access link (e.g., link 150a between relay station 130a and endpoint 140a), and the relay link (e.g., link 150d between relay station 130a and base station 120). In some embodiments the quality of the access link (e.g., link 150a or 150c) may need to be above a certain threshold before the endpoint will connect to the respective access station (e.g., base station 120 or relay station 130). As may be apparent, if an endpoint only detects a single link, whether with the base station or the relay station, satisfying this minimal spectrum efficiency requirement, it will connect to this access station since this is the only choice. However, in particular embodiments, if the endpoint finds multiple base stations or relay stations available, it may determine which access station to connect with by comparing the effective spectrum efficiencies of the respective access stations.

In particular embodiments, spectrum efficiency may be determined by the maximal usable modulation and coding scheme (MCS) level that can be used on the respective wireless connection. This may be determined by the Carrier to Interference-plus-Noise Ratio (CINR) of the wireless connection and may be measured in units of bits/Hz/sec. For example, a Quadrature Phase-Shift Keying (QPSK) modulated signal with code rate ½, may have a spectrum efficiency of 1 bit/Hz/sec.

Between each relay station and/or base station there may be a wireless connection or link, such as wireless connection 150d. As mentioned above, this wireless connection may be referred to as a relay link because it connects the base station with the relay station. A link may comprise various wireless resources such as, for example, a combination of a particular center frequency, a particular bandwidth, a particular time slot, and/or a particular subchannel (for example, as described in a downlink or uplink map). In particular embodiments, it may be convenient to discuss the amount of resources used by a link in terms of slots. Depending on the embodiment, a slot may comprise a particular number of subchannels and symbols (also known as time slots). For example, Section 8.4.3.1 in the Institute of Electrical & Electronics Engineers (IEEE) 802.16e-2005 Standard specifies a slot comprising a single subchannel and two symbols.

An increase in the number of wireless connections 150 may increase the impact and severity of interference between wireless connections 150. In particular embodiments, uplink sounding may be used to estimate the channel gain and interference strength between multiple relay stations 130 and base station 150. The uplink sounding may, therefore, be used in determining the quality and/or efficiency of the various wireless connections.

Although communication system 100 includes four different types of networks, networks 110a-110d, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired networking.

Generally, networks 110a, 110c, and 110d provide for the communication of packets, cells, frames, or other portions of information (generally referred to as packets herein) between endpoints 140 and/or nodes 170. Networks 110 may include any number and combination of wired links 160, wireless connections 150, nodes 170 and/or endpoints 140. For purposes of illustration and simplicity, network 110a is a MAN that may be implemented, at least in part, via WiMAX, network 110b is a PSTN, network 110c is a LAN, and network 110d is a WAN.

In particular embodiments, networks 110a, 110c and 110d may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b or 110d (e.g., nodes 170e or 170c may comprise a gateway). The gateway may allow PSTN 110d to be able to communicate with non-PSTN networks such as networks 110a, 110c and 110d.

Any of networks 110a, 110c or 110d may be coupled to other IP networks including, but not limited to, the Internet. Because IP networks share a common method of transmitting data, signals may be transmitted between devices located on different, but interconnected, IP networks. In addition to being coupled to other IP networks, any of networks 110a, 110c or 110d may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

As noted above, wireless connections 150 may represent a wireless link between two components using, for example, WiMAX. The extended range of a WiMAX base station and/or relay station may allow network 110a to cover the larger geographic area associated with a MAN while using a relatively small number of wired links. More specifically, by properly arranging base station 120 and multiple relay stations 130 around a metropolitan area, the multiple relay stations 130 may use wireless connections 150 to communicate with base station 120 and wireless endpoints 140 throughout the metropolitan area. Then base station 120 may, through wired connection 160a, communicate with other base stations, network components not capable of establishing a wireless connection, and/or other networks outside of the MAN, such as network 110d or the Internet.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170a may comprise another base station that is wired to base station 120 via link 160j and to network 110d via link 160a. As a base station, node 170a may be able to establish several wireless connections with various other base stations, relay stations, and/or endpoints. As another example, node 170e may comprise a gateway. This may allow network 110b, a PSTN network, to be able to transmit and receive communications from other non-PSTN networks, such as network 110d, an IP network. Node 170e, as a gateway, works to translate communications between the various protocols used by different networks.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140d may include a cell phone, an IP telephone, a computer, a video monitor, a camera, a personal data assistant or any other hardware, software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
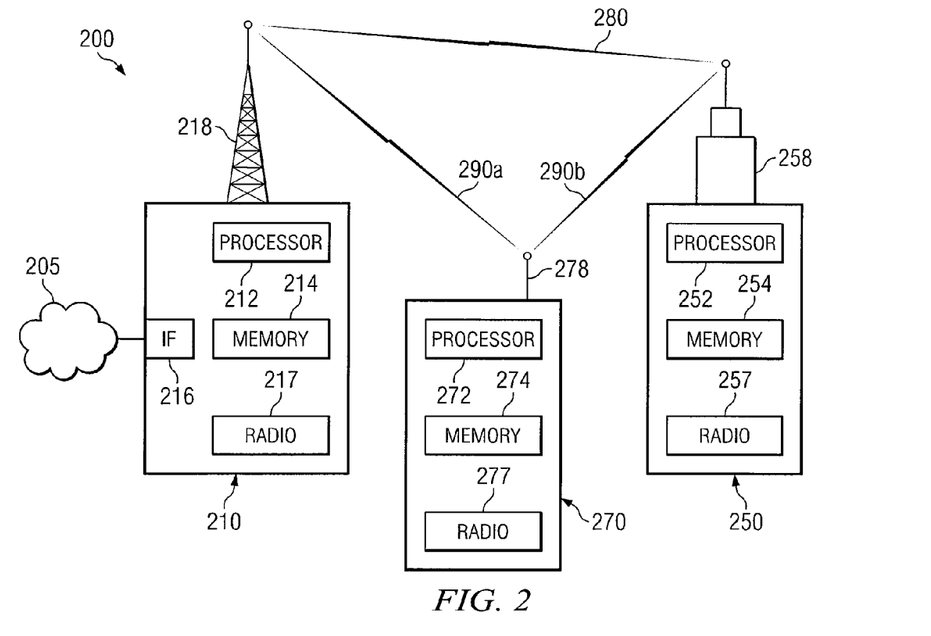
FIG. 2 illustrates a wireless network comprising a more detailed view of an endpoint, a base station and a relay station, in accordance with a particular embodiment.

FIG. 2 illustrates a wireless network comprising a more detailed view of an endpoint, a base station and a relay station, in accordance with a particular embodiment. More specifically, the depicted embodiment is a simplified network comprising network 205, base station 210, relay station 250 and endpoint 270. In different embodiments network 200 may comprise any number of wired or wireless networks, base stations, endpoints, relay stations, and/or any other components that may facilitate or participate in the communication of data and/or signals whether via wired or wireless connections. Base station 210 comprises processor 212, memory 214, interface 216, radio 217 and antenna 218. Similarly, relay station 250 and endpoint 270 comprise processors 252 and 272, memory modules 254 and 274, radios 257 and 277, and antennas 258 and 278. These components may work together in order to provide wireless networking functionality, such as providing wireless connections in a wireless network (e.g., a WiMAX wireless network).

Network 205 may comprise one or more of the networks described above with respect to FIG. 1. For example, network 205 may comprise the Internet, a LAN, WAN, MAN, PSTN or some combination of the above.

Processors 212, 252 and 272 may be microprocessors, controllers, or any other suitable computing devices, resources, or combinations of hardware, software and/or encoded logic operable to provide, either alone or in conjunction with other components, (e.g., memory 214, 254, and/or 274) wireless networking functionality. Such functionality may include providing various wireless features discussed herein. For example, processors 212, 252 and 272 may be able to determine the spectrum efficiency of one or more of wireless connections 280 and 290. Additional examples and functionality provided, at least in part, by processors 212, 252 and 272 will be discussed below.

Memory modules 214, 254, and 274 may be any form of volatile or non-volatile memory including, without limitation, magnetic media, optical media, random access memory (RAM), read-only memory (ROM), flash memory, removable media, or any other suitable local or remote memory component or components. Memory modules 214, 254, and 274 may store any suitable data or information utilized by base station 210, relay station 250, and endpoint 270, respectively, including software embedded in a computer readable medium, and/or encoded logic incorporated in hardware or otherwise stored (e.g., firmware). For example, in particular embodiments memory modules 214, 254, and 274 may store information regarding the spectrum efficiency of one or more particular links. Memory modules 214, 254, and 274 may also maintain a list, database, or other organization of data useful for determining how to route data to the proper component. For example, in some embodiments a tree structure (as opposed to a mesh structure) may be used in routing data from an endpoint to a base station. More specifically, there may be a known path from base station 210 to endpoint 270b. This path, or a portion thereof, may be stored in one or more of memory modules 214, 254, and 274.

Radios 217, 257, and 277 may be coupled to or a part of antennas 218, 258, and 278, respectively. Radios 217, 257, and 277 may receive digital data that is to be sent out to other base stations, relay stations and/or endpoints via a wireless connection. Radios 217, 257, and 277 may convert the digital data into a radio signal having the appropriate center frequency and bandwidth parameters. These parameters may have been determined ahead, for example by a combination of processor 212 and memory 214 of base station 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by processor 212, 252, or 272, as appropriate.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. While not depicted, relay station 250 and endpoint 270 may also include wired interfaces.

Relay stations 250 may, in essence, be smart repeaters between base station 210 and endpoint 270. Depending on the embodiment and configuration of a relay station, one or more of relay stations 250 may be transparent or non-transparent. From the perspective of an endpoint, a transparent relay station is perceived as though the endpoint were communicating with base station 210 while a non-transparent relay station is perceived as though it were another base station.

Endpoints 270 may be any type of wireless endpoints able to send and receive data and/or signals to and from base station 210 or relay stations 250. Some possible types of endpoints 270 may include desktop computers, PDAs, cell phones, laptops, and/or VoIP phones.

In particular embodiments, network 200 may be provisioned such that when endpoint 270 is connected to base station 210 via relay station 250 its transmissions are relayed by relay station 250 using separate carriers (out-of-band relay) for relay link 280 and access link 290b. In some embodiments, relay station 250 may use the same carrier (in-band relay) for relay link 280 and access link 290b. In those embodiments in which the same carrier is used, relay station 250 may store spectrum efficiency information from base station 210 or endpoint 270 in memory 254 and forward it to endpoint 270 or base station 210 on separate channels using, for example, a store-and-forward scheme and/or possibly using different MCS levels.

As discussed above, in particular embodiments it may be desirable for endpoint 270 to use its radio 277/antenna 278 interface to connect to the access link 290 having the greatest spectrum efficiency. However, in order for the spectrum efficiency of each access link to be properly compared, processor 272 may need to account for the efficiency of any relay links 280 between relay station 250 and base station 210. Thus, in those embodiments using in-band relaying, the effective spectrum efficiency of an access link 290 includes the efficiency of the access link as well as any preceding relay links between the access point (the relay station to which the endpoint is connected) and the base station. As discussed above the spectrum efficiency of a link may be determined by processors 252 and/or 272 of relay station 250 and/or endpoint 270 through measuring the link qualities (CINRs) of the respective link.

In particular embodiments, it may also be desirable to account for frequency reuse within a particular base station's cell (a base station's cell comprises the base station and any relay stations or endpoints connected thereto). More specifically, it may be that two or more links (either access or relay) within the cell may be spatially separated such that the same frequency can be used simultaneously. The reuse of a particular frequency may be accounted for via a frequency reuse factor. For example, in a network comprising one base station and m non-transparent relay stations, the access zone may be shared by the one base station and the m relay stations. In this situation the frequency reuse factor for the link associated with the base station and relay station is one and m, respectively. But in a network with transparent relay stations, the relay stations using the same frequency segment (i.e., in the same sector) are time division duplexed (TDD) (i.e., in different time slots). Hence, its frequency reuse factor for the access link may always be one. As the number of links reusing the same frequency increases so too may the frequency reuse factor. The frequency reuse factor may be stored and updated in memory 214 and/or 254 of base station 210 and/or relay station 250. Using radios 217 and/or 257 along with antennas 218 and/or 258 base station 210 and/or relay station 250 may be able to broadcast a frequency reuse factor as appropriate.

In particular embodiments, it may be desirable for endpoint 270 and/or relay station 250 to determine an effective spectrum efficiency that takes into account both the spectrum efficiency and the frequency reuse factor. For an access link from the base station, this may be done by processors 252 and/or 272 using, for example, equation (1):

$$\gamma_{\mathit{eff}}^D = \gamma_0 m_0 \quad (1)$$

where $\gamma_0$ is the spectrum efficiency of the link (e.g., access link 290a or relay link 280) between endpoint 270/relay station 250 and base station 210; and $m_0$ is the frequency reuse factor associated with the link within the cell or the sector of the cell. In general, the frequency reuse factor may be the number of times that the same radio resources (frequency and time slots) are used simultaneously within a cell or a sector of a cell. In the case of multiple-input-multiple-output (MIMO) or beamforming (BF) networks, it may be desirable to also consider the number of links that the same node (BS or RS) is simultaneously transmitting and receiving as frequency reuse.

When assessing the effective spectrum efficiency of a connection between base station 210 and endpoint 270 via relay station 250, access link 290b and relay link 280 may be considered together as a single composite link. More specifically, in certain scenarios the effective spectrum efficiency of the connection (e.g., the single composite link) may be determined using equation (2a):

$$\gamma_{\mathit{eff}}^{CL} = \frac{\gamma_1 m_1 \gamma_a m_a}{\gamma_1 m_1 + \gamma_a m_a}, \quad (2a)$$

where $\gamma_a$ is the spectrum efficiency of access link 290b; $\gamma_1$ is the spectrum efficiency of relay link 280; and $m_a$ and $m_1$ are the frequency reuse factors within base station 210's cell (or sector of a cell) of the frequencies used by access link 290b and relay link 280. In particular scenarios the effective spectrum efficiency of the connection (e.g., the single composite link) may be determined using equation (2b):

$$\gamma_{\mathit{eff}}^{CL} = \frac{(\delta \gamma_0 + \gamma_a m_a) \cdot \gamma_1 m_1}{\delta \gamma_0 + \gamma_a m_a + \gamma_1 m_1} \quad (2b)$$

where $\delta$ is an indicator parameter. For example, $\delta$ may be equal to one if the base station and the relay station are using the same resource at the same time, and the considered links involve the endpoint; otherwise $\delta$ may be equal to zero. This may be the case where the network comprises nontransparent relay stations and where the access links (e.g., from base station 210 to endpoint 270 and from base station 210 to endpoint 270 via relay station 250) are being considered. For intermediate links (e.g., from base station 210 to relay station 250) $\delta$ may be equal to zero. Also, in this case, $m_0$ and $m_1$ may be one, and $m_a$ may be equal to the number of relay stations in each sector at this hop. As another example, in a network comprising transparent relay stations, $\delta$ may always be equal to zero because the frequency reuse factors ($m_0$, $m_1$, $m_a$) are one. This may be because the base station and relay station that are using the same resource may be transmitting/receiving at different times.

Using the spectrum efficiency information and the frequency reuse factors, processor 272 may be able to use equations (1) and (2) to select the most efficient link. More specifically, processor 272 of endpoint 270 may be able to calculate $\gamma_{\mathit{eff}}^D$ and $\gamma_{\mathit{eff}}^{CL}$. Comparing these two calculations, processor 272 may determine whether $\gamma_{\mathit{eff}}^D$ is greater than $\gamma_{\mathit{eff}}^{CL}$, in which case processor 272 may choose access link 290a (between endpoint 270 and base station 210), otherwise processor 272 may choose access link 290b (between endpoint 270 and relay station 250). By applying this scheme it may be possible to increase the spectrum efficiency in base station 210's cell.

Figure 3:
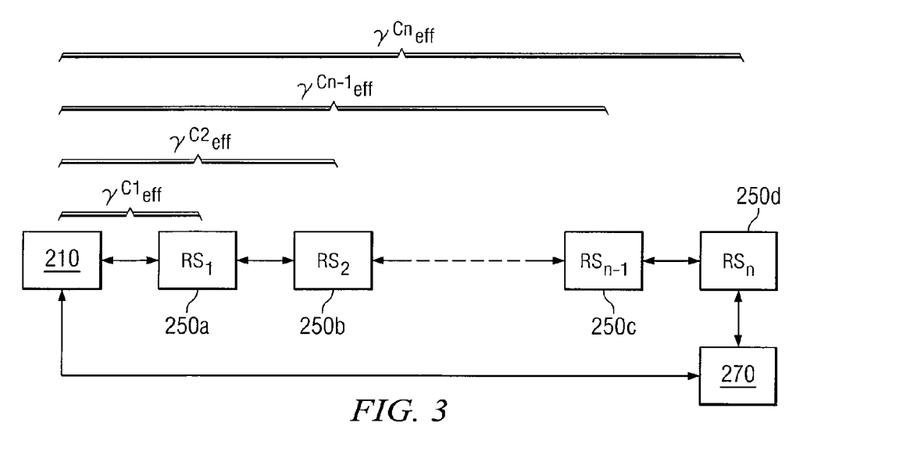
FIG. 3 illustrates a wireless network comprising a multiple relay stations, in accordance with a particular embodiment.

While equation (2) may be useful when there is only one relay station, in particular embodiments there may be multiple relay stations between endpoint 270 and base station 210. For example, if endpoint 270 is connected to base station 210 via multiple relay stations 250 as depicted in FIG. 3, the effective spectrum efficiency of the compound link from base station 210 to the nth relay station 250d may be calculated recursively similarly to equation (2). More specifically, for the ith relay station in the series of n relay stations 250 depicted in FIG. 3 the effective spectrum efficiency of the intermediate hop between relay stations may be determined using equation (3):

$$\gamma_{\mathit{eff}}^{CLi} = \frac{\gamma_i m_i \gamma_{\mathit{eff}}^{CL_i-1}}{\gamma_i m_i + \gamma_{\mathit{eff}}^{CL_i-1}}, \quad (3)$$

where $\gamma_i$ and $m_i$ are the spectrum efficiency and frequency reuse factor of the ith relay link. $\gamma_{\mathit{eff}}^{CLi-1}$ represents the effective spectrum efficiency from the immediately prior relay station back to the base station. Thus, the ith relay station, using equation (3) is able to determine the effective spectrum efficiency from itself back to base station 210.

Once the ith base station has determined effective spectrum efficiency back to the base station it may broadcast the resulting effective spectrum efficiency to any potential endpoints 270 and relay stations 250 in its coverage area. Thus, once the nth relay station 250d receives the $\gamma_{\it eff}^{CL}$ value from the n−1th relay station 250c, it is able to determine the effective spectrum efficiency from itself back to base station 210. This may allow endpoint 270 to consider a single value representing the effective spectrum efficiency to the base station 210 regardless of the number of hops between endpoint 270 and base station 210 using equation (4):

$$\gamma_{\it eff}^{CL} = \frac{\gamma_a m_a \gamma_{\it eff}^{CLn}}{\gamma_a m_a + \gamma_{\it eff}^{CLn}}, \quad (4)$$

The details of the composite link (e.g., how many relay stations are involved) is irrelevant and transparent to endpoint 270 for purposes of calculating the effective spectrum efficiency to determine to which access link to connect. When relay station 250 broadcasts $m_1\gamma_1$ as $\gamma_{\it eff}^{CL}$, equations 2 and 4 may become the same, and endpoint 270 may not be aware of how many intermediate relay stations are between its immediate access relay station 250 and base station 210.

In particular embodiments, other factors such as network load may also be considered. These other factors may be used by, for example, a network administrator as a way to influence which access station an endpoint connects to by adjusting the weight given to a link with that access station (or another access station). In such embodiments, one possible way to include the other factors is to advertise a properly scaled version of the effective bandwidth efficiency, $s_i * \gamma_{\it eff}^{CLi}$, where $s_i$ reflects other factors like network load. For example, when the network load is light $s_i$ may be greater than one, and when the network load is heavy $s_i$ may be less than one.

In particular embodiments, the effective spectrum efficiency of a composite link (e.g., from endpoint 270 to base station 210 via relay stations 250) may be calculated using equation (5):

$$\gamma_{\it eff}^{CL} = \frac{(\delta\gamma_0 + \gamma_a m_a) \cdot \gamma_{\it eff}^{CLn}}{\delta\gamma_0 + \gamma_a m_a + \gamma_{\it eff}^{CLn}} \quad (5)$$

As may be seen, equation (5) incorporates the spectrum efficiency of the direct access link between base station 210 and endpoint 270 ($\gamma_0$ and $m_0$) as well as the access link through the relay station. More specifically, equation (5) uses the effective spectrum efficiency of the composite link from base station 210 to the relay station, for example relay station 250d, under consideration. The $\gamma_{\it eff}^{CLn}$ value of the composite link may still be calculated by relay station 250d using equation (3).

Thus far several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations to provide the necessary coverage. Furthermore, in some embodiments, relay station 250 may have more or less radios. Some embodiments may include additional features.

Figure 4:
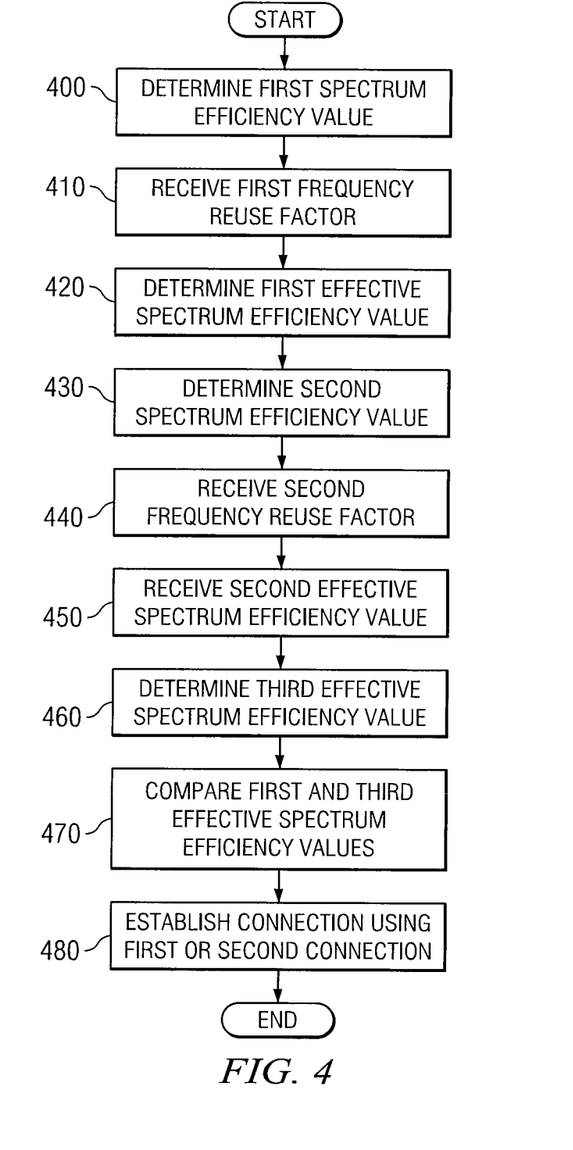
FIG. 4 illustrates a method for selecting an access link in a multi-hop relay network, in accordance with a particular embodiment.

FIG. 4 illustrates a method for selecting an access link in a multi-hop relay network, in accordance with a particular embodiment. For purposes of the scenario depicted in FIG. 4, it may be assumed that an endpoint has detected at least two different connections having access links (including a direct link between a base station and the endpoint) whose spectrum efficiency value is above a predetermined threshold. It may also be assumed, for purposes of simplicity with respect to the illustrated method, that only one base station is involved.

The method begins at step 400 where the first spectrum efficiency value is determined. The spectrum efficiency value may provide a mechanism by which the efficiency of a link may be quantified. The first spectrum efficiency value may be determined using known techniques to determine the efficiency of a first access link between an endpoint and a first access station, such as a base station or relay station. While the first access station may be a relay station, for purposes of this method it may be assumed that the first access station is a base station. In particular embodiments, spectrum efficiency may be determined by the maximal usable modulation and coding scheme (MCS) level that can be used on the respective wireless connection. This may be determined by the Carrier to Interference-plus-Noise Ratio (CINR) of the first access link.

At step 410 the first frequency reuse factor is received. The frequency reuse factor may generally indicate the extent that a particular frequency is being reused within a particular cell. More specifically, the first frequency reuse factor may indicate the extent that the frequency of the first access link is being reused. The first frequency reuse factor may be broadcast by the first access station.

At step 420 the first effective spectrum efficiency value is determined. The first effective spectrum efficiency value may indicate the efficiency of a connection from the endpoint to the base station. In the present scenario (in which the first access station is a base station) this may include the first access link. In scenarios in which the first access station is a relay station, the first effective spectrum efficiency value may include the first access link and any relay links that may be used by the first connection between the first access station (relay station) and the base station. The first effective spectrum efficiency value may take into account the first spectrum efficiency value as well as the first frequency reuse factor. In particular embodiments, other factors related to different parameters of the cell may also be considered.

At step 430 the second spectrum efficiency value may be determined. Similar to the first spectrum efficiency value, the second spectrum efficiency value may be determined using known techniques to determine the efficiency of a second access link (different than the first access link of step 400) between the endpoint and a second access station, such as a relay station.

At step 440 the second frequency reuse factor is received. Similar to the first frequency reuse factor, the second frequency factor may indicate the extent that the frequency of the second access link is being reused within the cell.

At step 450 a second effective spectrum efficiency value is received. In particular embodiments, the second effective spectrum efficiency value may have been determined by the second access point (e.g., using an appropriate spectrum efficiency value and frequency reuse factor). The second effective spectrum efficiency value may, in essence, provide a single value that includes the efficiency of any links between the second access station and the base station.

At step 460 a third effective spectrum efficiency value is determined. When determining the third effective spectrum efficiency value, particular embodiments may take into account the second effective spectrum efficiency vale, the second frequency reuse factor and the second spectrum efficiency value. By taking into account the second effective spectrum efficiency value it may be possible for the endpoint to easily determine the impact of any relay links that may be used between the second access station and the base station without having to be aware of their specific features (e.g., quantity, individual efficiency). In other words, the endpoint is not concerned with the number of relay stations that may be between the second access station and the base station. The endpoint need only know that the effective spectrum efficiency from the second access station to the base station is represented by the second effective spectrum efficiency value.

At step 470 the first and third effective spectrum efficiency values are compared. In other words, the endpoint is comparing two connections, one that is initiated with the first access station and one that is initiated with the second access station, to determine which provides a more efficient connection. In other words, the endpoint may determine which provides a higher efficiency.

At step 480 a connection is established using the first or second connection. As discussed above, this is based on the respective effective spectrum efficiency values of the connections. More specifically, if the first effective spectrum efficiency value is more efficient then the endpoint may connect to the base station via the first connection using the first access link to connect to the first access station; and if the third effective spectrum efficiency value is more efficient then the endpoint may connect to the base station via the second connection using the second access link to connect to the second access station.

Some of the steps illustrated in FIG. 4 may be combined, modified or deleted where appropriate, and additional steps may also be added to the flowchart. Additionally, steps may be performed in any suitable order without departing from the scope of the invention. For example, in particular embodiments, frequency reuse factors may be received before spectrum efficiency values are determined. As another example, both the first and second access stations may be relay stations. Accordingly, determining the first spectrum efficiency value may comprise steps similar to determining the third spectrum efficiency value.

While various implementations and features are discussed with respect to multiple embodiments, it should be understood that such implementations and features may be combined in various embodiments. For example, features and functionality discussed with respect to a particular figure, such as FIG. 2, may be used in connection with features and functionality discussed with respect to another such figure, such as FIG. 1, according to operational needs or desires.

Although particular embodiments have been described in detail, it should be understood that various other changes, substitutions, and alterations may be made hereto without departing from the spirit and scope of the present invention. For example, although an embodiment has been described with reference to a number of elements included within communication system 100 such as endpoints, base stations and relay stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for selecting an access link in a multi-hop relay network comprising:
   determining a first effective spectrum efficiency value of a first connection between an endpoint and a base station, wherein the first connection comprises at least a first access link between the endpoint and an access station, the first effective spectrum efficiency value indicative of the spectrum efficiency from the endpoint to the base station when using the first connection, wherein determining the first effective spectrum efficiency value comprises:
      receiving from the access station a first frequency reuse factor indicative of the extent a first frequency associated with the first access link is being reused;
      determining a first spectrum efficiency value of the first access link; and
      determining the first effective spectrum efficiency value using the first frequency reuse factor and the first spectrum efficiency value;
   determining a second effective spectrum efficiency value of a second connection between the endpoint and the base station via a relay station, wherein the second connection comprises at least a second access link between the endpoint and the relay station and at least one relay link between the relay station and the base station, the second effective spectrum efficiency value indicative of the spectrum efficiency from the endpoint to the base station when using the second connection, wherein determining a second effective spectrum efficiency value comprises:
      receiving from the relay station a second frequency reuse factor indicative of the extent a second frequency associated with the second access link is being reused;
      receiving from the relay station a third effective spectrum efficiency value from the relay station, the third effective spectrum efficiency value indicative of the spectrum efficiency of a relay connection between the relay station to the base station, the relay connection comprising the at least one relay link;
      determining a second spectrum efficiency value of the second access link between the endpoint and the relay station; and
      determining the second effective spectrum efficiency value using the second frequency reuse factor, the third effective spectrum efficiency value, and the second spectrum efficiency value;
   comparing the first and second effective spectrum efficiency values to determine which provides the higher efficiency; and
   establishing a connection using one of the first or second connections based on the comparison of the first and second effective spectrum efficiency values.

2. The method of claim 1, wherein the access station is a relay station and the first connection further comprises at least one relay link.

3. The method of claim 1 wherein the access station is the base station.

4. The method of claim 1:
further comprising receiving a first network factor and a second network factor indicative of a parameter associated with the multi-hop network; and
wherein:
   determining the first effective spectrum efficiency value further comprises using the first network factor; and
   determining the second effective spectrum efficiency value further comprises using the second network factor.

5. The method of claim 1, wherein the third effective spectrum efficiency value comprises at least one additional spectrum efficiency value from a second relay station indicative of the spectrum efficiency of a second relay link from the second relay station to the base station, and a spectrum efficiency value of the relay link between the relay station and the second relay station.

6. A method for selecting an access link in a multi-hop relay network comprising:
   at a first relay station, determining a first spectrum efficiency value of a first relay link between the first relay station and a second relay station, the first spectrum efficiency value indicative of the efficiency of the first relay link;
   at the first relay station, receiving from the second relay station a first frequency reuse factor and a second effective spectrum efficiency value indicative of the spectrum efficiency of a second relay connection from the second relay station to a base station;
   determining a first effective spectrum efficiency value of a first relay connection between the first relay station and the base station using the first spectrum efficiency value, the second effective spectrum efficiency value, and the first frequency reuse factor, wherein the first effective spectrum efficiency value indicative of the spectrum efficiency of the first relay connection;
   broadcasting the first effective spectrum efficiency value from the first relay station; and
   wherein further receiving a network factor indicative of a parameter associated with the multi-hop relay network;
   wherein determining the first effective spectrum efficiency value further comprises using the network factor.

7. A system for selecting an access link in a multi-hop relay network comprising:
   an interface operable to:
      receive from an access station a first frequency reuse factor indicative of the extent a first frequency associated with a first access link is being reused;
      receive from a relay station a second frequency reuse factor indicative of the extent a second frequency associated with a second access link is being reused; and
      receive from the relay station a third effective spectrum efficiency value indicative of the spectrum efficiency of a relay connection between the relay station and a base station, the relay connection comprising the at least one relay link;
   a processor coupled to the interface and operable to:
      determine a first effective spectrum efficiency value of a first connection between an endpoint and the base station comprising at least the first access link between the endpoint and the access station, the first effective spectrum efficiency value indicative of the spectrum efficiency from the endpoint to the base station when using the first connection, wherein the first effective spectrum efficiency value is determined using the first frequency reuse factor and a first spectrum efficiency value;
      determine a second effective spectrum efficiency value of a second connection between the endpoint and the base station via a relay station, wherein the second connection comprises at least the second access link between the endpoint and the relay station and the at least one relay link between the relay station and the base station, the second effective spectrum efficiency value indicative of the spectrum efficiency from the endpoint to the base station when using the second connection, wherein the second effective spectrum efficiency value is determined using the second frequency reuse factor, the third effective spectrum efficiency value, and a second spectrum efficiency value of the second access link between the endpoint and the relay station;
      compare the first and second effective spectrum efficiency values to determine which provides the higher efficiency; and
   wherein the interface is further operable to establish a connection using one of the first or second connections based on the comparison of the first and second effective spectrum efficiency values.

8. The method of claim 7, wherein the access station is a relay station and the first connection further comprises at least one relay link.

9. The method of claim 7, wherein the access station is the base station.

10. The method of claim 7:
wherein the interface is further operable to receive a first network factor and a second network factor indicative of a parameter associated with the multi-hop network; and
wherein the processor operable to:
   determine the first effective spectrum efficiency value is further operable to use the first network factor; and
   determine the second effective spectrum efficiency value is further operable to use the second network factor.

11. The method of claim 7, wherein the third effective spectrum efficiency value comprises at least one additional spectrum efficiency value from a second relay station indicative of the spectrum efficiency of a second relay link from the second relay station to the base station, and a spectrum efficiency value of the relay link between the relay station and the second relay station.

12. A system for selecting an access link in a multi-hop relay network comprising:
   a processor of a first relay station operable to determine a first spectrum efficiency value of a first relay link between the first relay station and a second relay station, the first spectrum efficiency value indicative of the efficiency of the first relay link; and
   an interface of the first relay station coupled to the processor and operable to receive from the second relay station a first frequency reuse factor and a second effective spectrum efficiency value indicative of the spectrum efficiency of a second relay connection from the second relay station to a base station;
   wherein the processor is further operable to determine a first effective spectrum efficiency value of a first relay connection between the first relay station and the base station using the first spectrum efficiency value, the second effective spectrum efficiency value, and the first frequency reuse factor, wherein the first effective spectrum efficiency value indicative of the spectrum efficiency of the first relay connection;

wherein the interface is further operable to broadcast the first effective spectrum efficiency value from the first relay station; and wherein the interface is further operable to receive a network factor indicative of a parameter associated with the multi-hop relay network;

the processor operable to determine the first effective spectrum efficiency value is further operable to use the network factor.

\* \* \* \* \*